United States Patent [19]

Fontana et al.

[11] Patent Number: 5,777,766

[45] Date of Patent: Jul. 7, 1998

[54] METHOD AND DEVICE FOR OPTICALLY RECOVERING THE SYNCHRONISM OF AN OPTICAL DIGITAL SIGNAL

[75] Inventors: Flavio Fontana, Cormano; Pierluigi Franco, Padua; Ilaria Cristiani, Pavia, all of Italy

[73] Assignee: Pirelli Cavi S.p.A., Italy

[21] Appl. No.: 739,166

[22] Filed: Oct. 30, 1996

[30] Foreign Application Priority Data

Nov. 14, 1995 [IT] Italy ................... MI95A2332

[51] Int. Cl.[6] ........................................ H04B 10/00
[52] U.S. Cl. ................ 359/158; 359/160; 359/173
[58] Field of Search ................ 359/134–135, 359/158, 160–161, 173, 187–188; 375/354

[56] References Cited

U.S. PATENT DOCUMENTS

| | | |
|---|---|---|
| 5,444,560 | 8/1995 | Barnsley ................ 359/158 |
| 5,457,559 | 10/1995 | Saito et al. ................ 359/135 |

FOREIGN PATENT DOCUMENTS

| | | | |
|---|---|---|---|
| 0619658A2 | 4/1994 | European Pat. Off. ........ H04L 7/00 |
| WO93/22855 | 4/1993 | WIPO ................ H04L 7/027 |

OTHER PUBLICATIONS

Giles et al., "All-Optical Regenerator", Electronics Letters, 7th Jul. 1988, vol. 24, No. 14, pp. 848–850.

Nakazawa et al., "NOLM Oscillator and its Injection Locking Technique for Timing Clock Extraction and Demultiplexing", Electronics Letters, 6th Jun. 1996, vol. 32, No. 12 pp. 1122–1123.

IEEE Journal of Quantum Electronics, vol. 28, No. 4, Apr. 1, 1992, pp. 895–900.

Primary Examiner—Kinfe-Michael Negash
Attorney, Agent, or Firm—Brooks Haidt Haffner & Delahunty

[57] ABSTRACT

The device and method are based on tapping off a predetermined line signal fraction and inputting it, together with a continuous pumping radiation, to a resonant cavity which comprises a non-linear wave guide. The value of the pumping wavelength is related to the wavelength of the line signal pulses to produce therewith a four-wave mixing (FWM) effect in the non-linear wave guide. In travelling the non-linear wave guide, a clone signal is generated by FWM effect which duplicates the pulse sequence of the line signal at a clone wavelength. By adjusting the length of the resonant cavity such that, in inputting the line signal, each of its pulses will come in at exactly a pulse of the clone signal which is being circulated within the cavity, a clone signal can be circulated within the resonant cavity whose pulse sequence represents the optical clock signal sought.

12 Claims, 6 Drawing Sheets

METHOD AND DEVICE FOR OPTICALLY RECOVERING THE SYNCHRONISM OF AN OPTICAL DIGITAL SIGNAL

FIELD OF THE INVENTION

This invention relates to a method and a device for optically recovering the synchronism of an optical digital signal by the construction of an optical clock signal which comprises a sequence of pulses with an identical repeat frequency.

BACKGROUND OF THE INVENTION

In a transmission system operated in digital (e.g. binary) form, for the incoming information to be read correctly, it is necessary that the frequency of repetition of the pulses (0 or 1) which make up the line signal be known; in fact, a 0 pulse is actually a pulse vacancy and it can be distinguished from the space which separates any two pulses only if the time when either a 0 or a 1 pulse is due to appear in the line signal is known exactly. A knowledge of the pulse repeat frequency in the line signal allows the line signal to be read at its pulses only, thus preventing the pulse vacancies between successive pulses from being mistaken for 0 pulses. It should be considered that, in general, a pulse sequence read error in a digital signal may result in erroneous evaluation of the information by an unforeseeable margin; for example, should a binary sequence 010011 be read as 000011 (i.e., with a read error at the second pulse), the decimal value 3 would wrongly be obtained instead of 17. A similar situation is obviously met where the digital signal is non-binary coded; in this case, there would be 0 and non-0 (i.e., 1, 2, 3, etc., depending on coding) signals instead of 0 and 1 signals. Later in this specification, reference may be made on occasions to just binary digital signals, for simplicity, it being understood that digital signals coded in others than the binary form are also encompassed by the term.

The operations that result in an exact re-construction of the line signal pulse repeat frequency are commonly referred to as clock recovery.

For a digital line signal, clock recovery is usually performed electronically. However, in the field of fiber optics telecommunications, the electronic processing of clock recovery places a definite limit on the bit rate. Whereas the transmission of signals in optical form using current technologies can attain rates on the order of hundreds of Gbit/s—and still faster rates are anticipated for it in future years—clock recovery by the electronic (or more appropriately, opto-electronic) way places an upper limit of 10 to 20 Gbit/s on bit rate, due to electronic processing being inherently slower.

It is, therefore, of the utmost importance that clock recovery be performed by all optical means, if the bottlenecks of electronic processing are to be avoided.

Several arrangements have been proposed in the literature for optical clock recovery, but they all have drawbacks that make their application to actual systems difficult if not impracticable.

RELATED ART

Some of the previously proposed arrangements (see K. Smith and J. K. Lucek, "All-optical clock recovery using a mode-locked laser", El. Lett., 28, pages 1814–1816, 1992; A. D. Ellis, K. Smith and D. M. Patrick, "All optical clock recovery at bit rates up to 40 Gbit/s", El. Lett., 29, pages 1323–1324, 1993; D. M. Patrick and R. J. Manning, "20 Gbit/s all-optical clock recovery using semiconductor nonlinearity", El. Lett., 30, pages 151–152, 1994; WO 93/22855) require an input line signal of very high power, higher than the power normally available in telecommunications systems; and moreover, the effectiveness of clock recovery is heavily dependent on the line signal power. It is on this account that a practical application of such arrangements appears to be problematical.

Other arrangements reported in the literature (see P. E. Barnsley, H. J. Wickes, G. E. Wickens and D. M. Spirit, "All-optical clock recovery from 5 Gbit/s RZ data using a self-pulsating 1.56 µm laser diode", IEEE Photon. Technol. Lett., 3, pages 942–945, 1994; S. Kawanishi, H. Takara, M. Saruwatari and T. Kitoh, "Ultralight-speed phaselocked-loop-type clock recovery circuit using a travelling-wave laser diode amplifier as a 50 GHz phase detector", E. Lett., 29, pages 1714–1716, 1993; O. Kamatami, S. Kawanishi and M. Saruwatari, "Prescaled 6.3 Gbit/s TDM optical signal with 50 GHz PLL using four-wave mixing in a travelling wave laser diode optical amplifier", El. Lett., 30, pages 807–809, 1994; P. E. Barnsley and H. J. Wickes, "All-optical clock recovery from 2.5 Gbit/s NRZ data using selfpulsating 1.58 µm laser diode", El. Lett., 28, pages 4–6, 1992) involve the use of a source of pulsed light energy. These arrangements are made impractical by the difficulty of providing such a pulsed source.

Thus, the problem exists of providing for clock recovery in a digital line signal by the optical way, in a suitable manner for practical use in a real fiber optics telecommunications system.

SUMMARY OF THE INVENTION

Therefore, according to a first aspect of this invention, there is provided a method for optically recovering the synchronism of an optical line digital signal which comprises a sequence of digital pulses travelling through an optical fiber line at a preset pulse repeat frequency, by constructing an optical clock signal which comprises a pulse sequence having an identical repeat frequency, the method comprising the steps of:

tapping off a predetermined fraction of the line signal;

inputting the line signal fraction to a resonant cavity which includes a non-linear waveguide;

coupling the tapped-off line signal fraction with a continuous pumping radiation which has predetermined power and predetermined pumping wavelength, the pumping wavelength value being so related to the wavelength of the line signal pulses as to produce with the latter a four-wave mixing (FWM) effect in the non-linear waveguide;

causing the tapped-off line signal fraction and the pumping radiation to travel through the non-linear waveguide to generate, as by FWM effect, a clone signal duplicating the pulse sequence of the line signal at a clone wavelength;

filtering the aggregate of the line signal fraction, the pumping radiation, and the clone signal to only pass the latter;

circulating the clone signal within the resonant cavity;

adjusting the length of the resonant cavity such that, upon the line signal being input to the resonant cavity, each pulse of the line signal comes in exactly at a pulse of the clone signal being circulated within the cavity; and tapping a fraction of the clone signal off the resonant cavity, with the pulse sequence of the clone signal representing the clock signal sought.

The phenomenon known as four wave mixing (FWM) is a non-linear type of interaction which occurs within a waveguide made of a material having a high non-linear coefficient (e.g., a suitable optical fiber, semiconductor crystals, optical polymers, or else) when signals having different wavelengths are propagated therewithin. This phenomenon consists of the fact that three optical signals present within the waveguide generate a fourth signal that propagates colinearly with the three others; in general, the fourth signal is undesired and has the features of noise in the sense that it will disturb normal transmission. Reference will be mostly made hereinafter to an optical fiber, it being understood that any other waveguide having the required non-linear characteristics could be provided instead of the optical fiber.

The above-noted phenomenon is described, for example, in Journal of Lightwave Technology, Vol. 8, No. 9, September 1990, pages 1402–1408. This effect is due to non-linear phenomena of the third order which may grow to be quite powerful, both in consequence of the high field strength in the core of the waveguide and with long lengths of signal interaction.

It is specifically reported in the above publication that, for a given optical fiber, the maximum of efficiency in the generation of the fourth wave (i.e., the noise effect in the system) can be reduced by increasing the differences between signal frequencies, the chromatic dispersion, or the transmission length, by virtue of the signal phase shift also becoming greater.

It is found that if a particular phase condition, known as phase matching, sets in among the three waves, the FWM phenomenon is triggered and the fourth wave generated; the frequencies of the four waves being tied by the following relation:

$$\omega_1 + \omega_2 = \omega_3 + \omega_4 \qquad (1)$$

The efficient generation of the fourth wave can be maximized by having the phase matching condition satisfied as fully as possible, which condition is dependent on the positions of the signal wavelengths relative to the wavelength of the dispersion null point for the optical fiber affected by the phenomenon.

It is to be recalled that a chromatic dispersion phenomenon occurs in optical fibers, which is due to the fact that the different color components—each characterized by its own wavelength—of each pulse travel through the fiber at different speeds, resulting in lengthened pulse durations. As a consequence of this extended duration, successive pulses which were separate at the time of their emission may partly overlap by the time they are received, and reach a point at which they are no longer recognizable as discrete entities. So-called step index (SI) fibers are available which exhibit optical characteristics whereby chromatic dispersion can be suppressed at a wavelength of about 1300 nm. However, in view of that fiber optics telecommunications use wavelengths in the 1500 to 1600 nm range, optical fibers have been developed, known as dispersion shifted (DS) fibers, wherein the null point of chromatic dispersion is shifted into the range of 1500 to 1600 nm. A similar result can be obtained by suitably designing the waveguide structure within a material which has a high non-linear coefficient.

The FWM of interest to this invention is the so-called degenerated FWM, wherein the frequencies $\omega_1$ and $\omega_2$ are coincident. In this case, relation (1) can be re-written as follows:

$$2\omega_p = \omega_s + \omega_c \qquad (2)$$

where, $\omega_p$ is a pumping frequency, $\omega_s$ is a line signal frequency, and $\omega_c$ is a clone signal frequency. Stated otherwise, if a pumping radiation at the frequency $\omega_p$ and a line signal at the frequency $\omega_s$ are present in the fiber, a clone signal with frequency $\omega_c$ is obtained because of the FWM phenomenon. The clone signal power is dependent on the non-linearity of the phenomenon, the length of the fiber section used, the power of the pumping radiation and the line signal, and the degree of success attained in phase matching.

When the above-noted phenomenon takes place in a resonant cavity, a lasing action may develop at the frequency of the clone signal if the FWM gain obtained over a complete routing through the cavity can be made to exceed the loop losses. If this condition cannot be met at usual power levels for transmission lines, the clone signal can be amplified (again optically, using an optical amplifier); prior to amplification, the clone signal is filtered out of the line signal and the pumping radiation, so as to prevent the line signal and pumping radiation from bringing the amplifier to saturation.

Preferably, the method comprises a step of amplifying the clone signal, with the amplification being adjusted to have the gain for the clone signal lower by a predetermined value than the overall attenuation through the loop.

By adjusting the amplification gain so that the above value approaches zero, it can be arranged for the cavity to develop no lasing action in the absence of FWM, whereas upon the gain over a single turn being increased by contribution from FWM, the loop will develop a lasing action at the wavelength of the clone signal.

Preferably, the step of coupling the tapped-off line signal fraction with the continuous pumping radiation will precede the step of inputting the line signal fraction to the resonant cavity.

The resonant cavity may comprise a loop-like optical path, with the non-linear wave guide being included in the loop-like path. Alternatively, the resonant cavity may comprise a linear cavity provided at its extremities with optical feedback means for at least a portion of the optical signals propagated in it, the non-linear wave guide being included in the linear cavity.

The non-linear wave guide may be a different type, preferably comprised of an optical fiber having its optical dispersion null point shifted.

According to a second aspect, the present invention relates to an optical clock recovery device for recovering the synchronism of an optical digital line signal which comprises a sequence of digital pulses travelling through a fiber optics line at a preset pulse repeat frequency, by the construction of an optical clock signal which comprises a sequence of pulses having an identical repeat frequency, the device comprising:

a first splitter, on the line for tapping a fraction of the line signal therefrom;

a generator of continuous pumping radiation having a predetermined power and predetermined pumping wavelength, the value of the pumping wavelength being related to the wavelength of the line signal pulses to produce a four-wave mixing (FWM) effect therewith;

a second splitter for coupling the tapped line signal fraction with the pumping radiation;

a resonant cavity;

a third splitter for inputting the tapped line signal fraction and pumping radiation to the resonant cavity;

within the resonant cavity, a non-linear wave guide of sufficient length to have a clone signal generated therein by FWM effect which duplicates the pulse sequence of the line signal at a clone wavelength;

an optical filter means within the resonant cavity to admit circulation inside the resonant cavity of the clone signal only;

a means of adjusting the length of the resonant cavity; and a fourth splitter on the resonant cavity for tapping, off the resonant cavity, a fraction of the clone signal travelling through the resonant cavity, the pulse sequence of the clone signal being the clock signal sought.

Preferably, the resonant cavity includes an optical amplifying means for the clone signal.

The resonant cavity may comprise a loop-like optical path, with the non-linear wave guide being included in the loop-like path. Alternatively, the resonant cavity may be a linear cavity provided at its extremities with optical feedback means for at least a portion of the optical signal propagated therein, with the non-linear wave guide being included in the linear cavity.

The non-linear wave guide may be a different type; preferably, the wave guide comprises an optical fiber having its optical dispersion null point shifted to a predetermined value close to the wavelength of the optical line signal.

BRIEF DESCRIPTION OF THE DRAWINGS

Further features and advantages of the invention will be more clearly apparent from the following detailed description of two preferred embodiments of a device according to the invention, to be read in conjunction with the accompanying drawings, in which:

FIGS. 2 to 5 illustrate an example, namely.

DESCRIPTION OF PREFERRED EMBODIMENTS

In the drawing figures, generally shown at 10 is an optical fiber of a fiber optics transmission line, e.g. a telecommunications line, through which an optical line digital signal, e.g. in binary form, is made to travel. The line signal is, therefore, made up of a sequence of 0 and 1 pulses. The 1 pulses are characterized by a line signal wavelength and corresponding line signal frequency ($\omega_s$), while the 0 pulses are basically pulse vacancies. The pulses (0 and 1) follow one another along the line 10 at a predetermined spacing from each other, that is with a predetermined repeat frequency.

Generally indicated at 11 is an optical clock recovery device for the line signal, on the line 10. The device 11 comprises a first splitter 12 having an input 13 connected in the line 10, and two outputs: a primary output 14 which re-introduces the line signal into the line 10, and a secondary output 15 which taps off a predetermined fraction, e.g. on the order of 5%, of the line signal power and re-directs it to an optical fiber 16. To be exact, a splitter (such as that designated 12, and others to be described in the following) is usually provided with four connections, namely two inputs and two outputs. One of these connections is not used, and therefore, left blind; this connection is not shown in the drawings.

The device 11 also comprises a pumping laser source 17 capable of generating a pumping radiation with a predetermined wavelength, so as to meet the condition for phase matching to the line signal. The pumping radiation goes out from an output 18 of the laser pump and is supplied on an optical fiber 19.

The device 11 further comprises a second splitter 20 having two inputs 21 and 22 to which the optical fibers 16 and 19 are respectively run, and an output 23 to which an optical fiber 24 is connected. The second splitter 20 is of the so-called 50/50 type, that is, from the output 23, the incoming signals to the two inputs 21 and 22 go out in simple overlapped relationship, attenuated by 3 dB.

The device 11 additionally comprises a resonant cavity formed of a loop-like optical path 25 connected to the optical fiber 24 through a third splitter 26. Specifically, the splitter 26 has two inputs 27, 28 and an output 29. Run to the input 27 is the optical fiber 24, while the loop-like optical path 25 is closed across the output 29 and the input 28. The third splitter 26 is, like the second 20, of the so-called 50/50 type, the incoming signals to the two inputs 27, 28 going out from the output 29 in simple overlapped relationship, attenuated by 3 dB.

The loop-like path 25 comprises the following elements in series with one another, in the following order from the output 29 to the input 28 of the third splitter 26: a wave guide formed of an optical fiber section 30 which is sufficiently long to promote the FWM phenomenon, a filter unit 31, and an optical amplifier 32. In addition, provided between the optical amplifier 32 and the input 28 of the third splitter 26, is a fourth splitter 33 having an input 34 connected in the loop-like path 25, and two outputs: a primary output 35 connected in the loop-like path 25, and a secondary output 36 which taps off a predetermined power fraction, e.g. on the order of 50%, of the signal travelling through the loop-like path 25 and re-directs it to an output optical fiber 37.

The loop-like path 25 further comprises a means of adjusting the path own length. This means comprises a Peltier element 38 acting on a fiber section of the loop-like path 25 to vary its length through changes in temperature. The element 38 is driven by an electronic control unit 39 which is feedback controlled by a fraction of the outgoing signal from the loop-like path 25 on the output optical fiber 37. For this purpose, a fifth splitter 40 is connected in the fiber 37 which has an input 41 and a main output 42 connected in series to the output fiber 37, and a secondary output 43 which taps off a predetermined power fraction, e.g. on the order of 1%, of the signal which is travelling through the output fiber 37 and re-directs it to the control unit 39 along an optical fiber 44.

The device 11 comprises, moreover, two polarization control elements, a first element 45 on the optical fiber 19 for the pumping radiation, and a second element 46 on the loop-like path 25, between the fourth splitter 33 and the third splitter 26, as well as two additional optical amplifiers, namely a second optical amplifier 47 on the optical fiber 19, downstream from the first polarization control element 45, and a third optical amplifier 48 on the optical fiber 24.

The filter unit 31 comprises a filter set to the clone wavelength and having transmissivity of less than 20 dB on the other wavelengths. The unit 31 functions to separate the clone signal generated by the FWM process from the line signal and the pumping signal, and can be implemented using a variety of conventional technologies in quite an equivalent manner for the purpose of this invention. For example, a photochromic grating filter may be used (associated with a circulator); filters of this kind are well known from the literature and available commercially, and suit specially well this application because of their full compatibility with fiber optics circuitry.

These filters consist of a portion of an optical wave guide, such as an optical fiber, along which the refractive index undergoes a periodic change, a partial signal reflection occurring at the index change; if the signal portions reflected at each change of the index are in phase with one another, constructive interference is produced and the incident signal is reflected.

The condition for constructive interference, corresponding to maximum reflection, is given by the relation $2\,l=\lambda_s/n$, where l is the pitch of the grating defined by the changes in refractive index, $\lambda_s$ is the wavelength of the incident radiation, and n is the refractive index of the optical wave guide core. The phenomenon just described is referred to in the literature as Bragg's distributed reflection.

The periodic change of the refractive index can be obtained using conventional techniques, for example, by exposing a portion of the optical fiber stripped of its protective polymeric coating to the interference fringes formed by a powerful UV beam (such as that generated by an excimer laser, a frequency-duplicated argon laser, or a frequency-quadrupled Nd:YAG laser) caused to interfere with itself by a suitable interferometric system, e.g. by a silicon phase mask as described in U.S. Pat. No. 5,351,321.

The fiber, more specifically the fiber core, is thus exposed to a UV radiation whose strength changes periodically along the optical axis. In the core portions reached by UV radiation of maximum strength, a partial break in the Ge—O bonds occurs which results in the refractive index undergoing a permanent change.

By so selecting the grating pitch as to verify the constructive interference relationship, the center wavelength of the reflected band can be determined as desired by conventional methods.

Using this technique, filters can be obtained, for example, with a wavelength band (reflected at −3 dB) typically in the 0.2 to 0.3 nm range, a band center reflectivity of up to 99%, a reflected band center wavelength which can be set within about ±0.1 nm at the fabrication stage, and a variation of the band center wavelength with temperature of 0.02 nm/°C. or lower.

That value can be obtained using fixed pitch gratings.

Where the wavelengths to be filtered allow of wider tolerance margins, optical fiber filters of the Bragg's distributed reflection type can be provided with a sufficiently wide reflection-mode band by imposing a variable pitch on the grating, so as to obtain a so-called chirped grating.

Conventional techniques can be used for this purpose as disclosed, for example, in an article by P. C. Hill et al. published in Electronic Letters, Vol. 30, No. 14, Jul. 7, 1994, pages 1172–1174.

Gratings of this kind are available, for example, from Photonetics, Inc., Wakefield, Mass. (U.S.A.) for the desired reflection wavelengths.

The devices 11 operates as follows.

A line signal of the digital, e.g. binary, type is caused to travel along the line 10, which signal consists of a sequence of 0 and 1 pulses at a mutual spacing which is based on a given repeat frequency. The device 11 is to be utilized in the construction of a clock signal which consists of a sequence of 1 pulses at the same repeat frequency as the line signal.

Through the first splitter 12, a fraction of the line signal is tapped off and re-directed to the device 11. The line signal power will be altered (reduced) barely to a minimal extent because, as mentioned previously, the splitter 12 draws but a minimal fraction (in the 5% range) of the line signal power. The tapped fraction is supplied into the optical fiber 16 and has all the characteristics of the line signal, except that its power ranks lower; in particular, the pulses will follow one another in the same order and at the same frequency.

The tapped line signal fraction is superimposed on the pumping radiation (as produced by the laser 17 and amplified by the optical amplifier 47) within the second splitter 20. The resultant signal is supplied into the optical fiber 24, optionally amplified by the optical amplifier 48, and passed to the loop-like optical path 25 through the third splitter 26.

Since the conditions for phase matching between the wavelengths of the line signal and the pumping radiation are met, through the initial portion of the loop-like optical path 25 formed by the optical fiber section 30, the joint presence of the line signal fraction and the pumping radiation will result in a clone signal being generated by the FWM phenomenon. The pumping radiation being continuous, a pulse sequence equal to and having the same repeat frequency as that of the line signal will be duplicated in the clone signal; the clone signal pulses obviously having the clone signal wavelength.

Subsequently, within the filter unit 31, the line signal fraction and the pumping radiation are both suppressed to only let the clone signal through. The clone signal is then amplified by the optical amplifier 32 and split by the fourth splitter 33 between the loop-like path 25 and the output optical fiber 37.

The clone signal left within the loop-like path 25 will reach the third splitter 26, wherein it becomes coupled with the incoming signal from the optical fiber 24. By suitably adjusting the length of the loop-like path 255, the pulses of the clone signal are made to present themselves simultaneously with the pulses of the line signal. The length adjustment for the loop-like path 25, which must be effected with special accuracy, can be obtained by heating or cooling an optical fiber portion through the Peltier element 38 under control by the unit 39.

If a 0 pulse of the clone signal meets a 1 pulse of the line signal, at the next turn through the loop-like path 25, the 0 pulse of the clone signal will then become a 1 pulse by FWM effect due to the concurrent presence of the 1 pulse from the line signal.

If a 0 pulse is present in both the input line signal and the clone signal, the clone signal pulse will remain a 0 throughout the next turn.

If a 1 pulse is present in both the input line signal and the clone signal being circulated around the loop-like path, then this clone signal pulse will be amplified by FWM at the next turn, that is, the 1 pulse of the line signal will generate a 1 pulse at the clone wavelength which is added to the existing 1 pulse.

On the other hand, if a 1 pulse of the clone signal meets a 0 pulse of the line signal, the clone signal pulse will have to complete another turn before it can be amplified by FWM; should this 1 pulse of the clone signal keep making turns around the loop-like path 25, always meeting 0 pulses of the line signal, the 1 pulse of the clone signal gradually looses power. The number of turns that it can make before cancelling itself—i.e. before becoming a 0 pulse—depends on both the FWM gain (which determines the initial power of the pulse and can be increased for a given power of the line signal by increasing the pumping radiation power) and on the net losses through the loop-like path 25. These net losses are equal to the difference between the losses without the amplifier 32 and the gain of the amplifier 32, and can be reduced as desired by suitably selecting the gain for the amplifier 32, that is, by causing that gain to compensate for the losses through the loop-like path 25 as closely as possible.

Consequently, within a short time period, the loop-like path 25 will be travelled by a signal consisting of a sequence of all 1 pulses which have exactly the same repeat frequency as the line signal. Accordingly, this signal will be the clock signal sought, and can be tapped off the loop-like path 25 through the output optical fiber 37.

The number of turns that a 1 pulse of the clone signal can make around the loop-like path 25 and still meet 0 pulses of the line signal at the input defines the so-called robustness of the clock recovery device, i.e. its capability to withstand long sequences of 0 pulses while still emitting 1 pulses. The robustness of the device 11 may be enhanced as desired, without changing the amount of power detracted from the line signal but rather by either changing the amplifier 32 gain, or the pumping radiation power, or the gain of the amplifier 47 or 48. (Increasing the amplifier 47 gain is the equivalent of increasing the pumping power, while increasing the amplifier 48 gain is the equivalent of increasing at one time the pumping radiation power and the line signal power.)

As the repeat frequency of the line signal varies, it is sufficient that the loop-like path 25 be kept synchronized (by means of the control unit 39 and the element 38) such that the 1 pulses of the clone signal arrive at the third splitter 26, at each turn at a corresponding time to the arrival of a pulse (0 or 1) of the line signal.

For the device 11 to operate properly, it is preferable that the polarization state of the light being circulated through the loop-like path 25 be controlled. This is provided by the polarization controllers 45 and 46. Alternatively, the use of polarization retaining fibers or arrangements may be considered which can make the FWM phenomenon independent of the polarization state of the line signal being input to the loop-like path 25. For example, DC laser pumps may be used which are depolarized either by means of depolarizers or on account of their inherent operating principle, such as long cavity on-fiber lasers.

Thus, the invention enables a clock signal to be reconstructed in an all-optical manner, thereby avoiding the bottlenecks of electronic processing.

Furthermore, the clock recovery is performed without detracting a significant amount of power from the signal on the line. The clock recovery operation can, therefore, be carried out at any point along the line without interfering with the remainder of the transmission system.

Another advantage of this invention is that the clock recovery is feasible at any power level, even a very low one, of the line signal. In fact, the power is supplied to the clock signal from the pumping radiation, as previously mentioned.

Also, a noteworthy advantage is that the system can be made as robust as desired, regardless of the line signal, so long as it will supply pumping radiation of adequate power.

Finally, notice that the pumping power is supplied in a continuous rather than pulsed fashion, so that it can be obtained and controlled much more easily.

Figure 1:
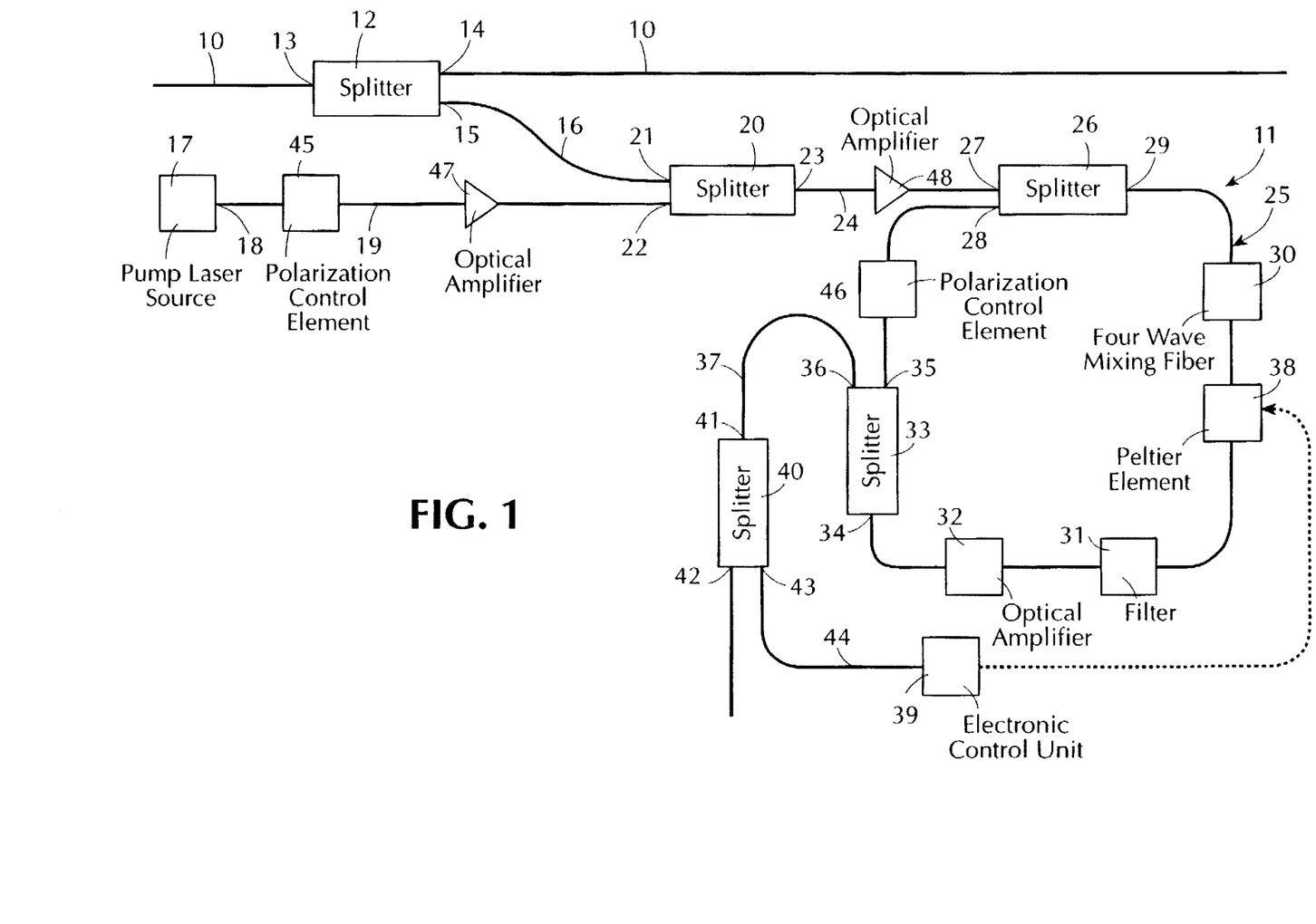
FIG. 1 is a circuit diagram of a device according to the invention.
Figures 6, 7:
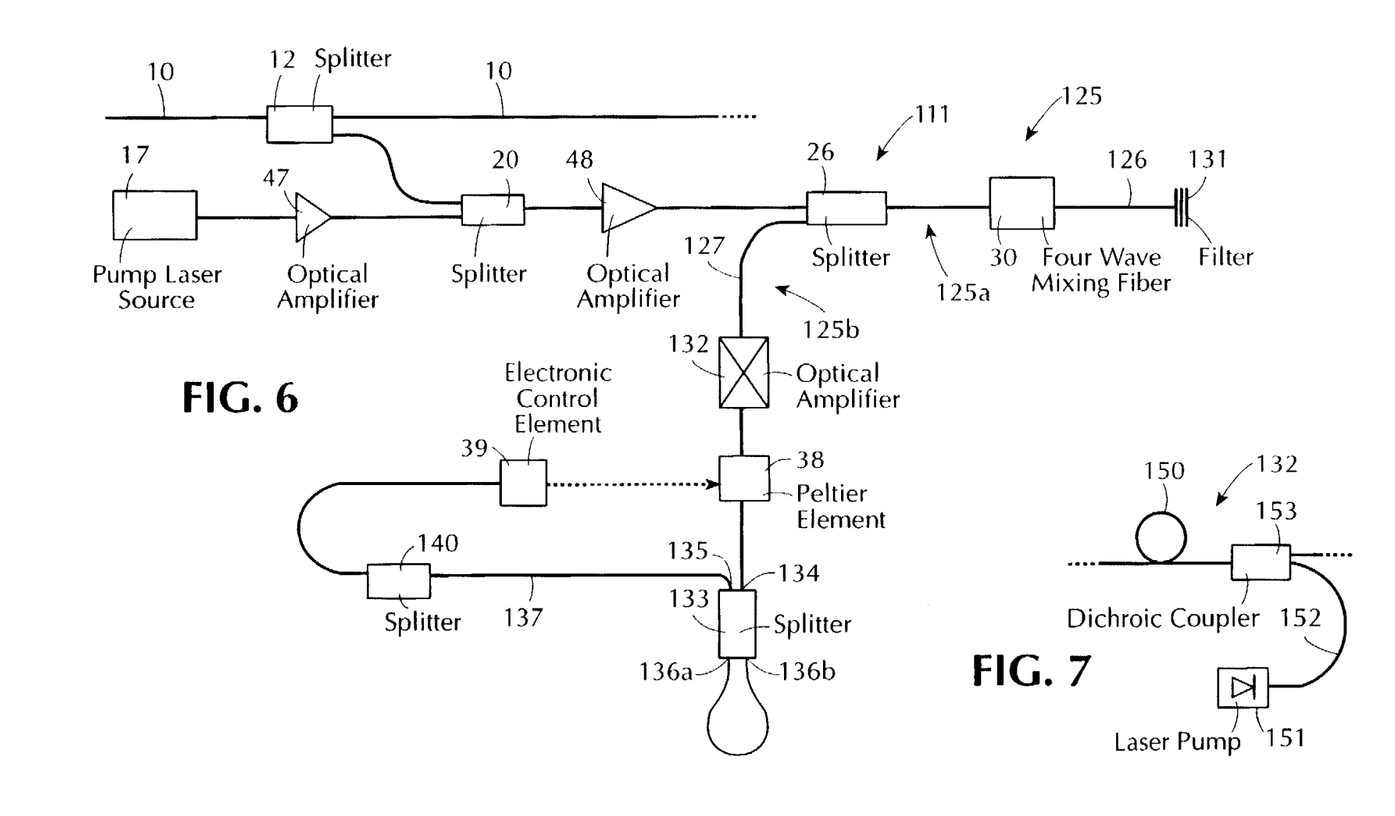
FIG. 6 is a circuit diagram of a modification of the device in FIG. 1.
FIG. 7 is a more detailed diagram of the amplifier included in the circuit diagram shown in FIG. 6.

A modified embodiment of the invention is illustrated by the device 111 shown in FIG. 6. In this modification, the resonant cavity comprises a linear cavity 125 instead of the loop-like path 25; the external elements of the resonant cavity are the same as in the device 11 of the previous embodiment, and accordingly denoted by the same reference numerals. In particular, the cavity 125 is connected to the optical fiber 24 through a splitter 26.

Taking the input direction of the signals from the fiber 24 through the splitter 26, the linear cavity 125 comprises a section 125a located downstream from the splitter 26 and a section 125b located upstream thereof.

The section 125a of the linear cavity 125 comprises an optical fiber 126 in which a wave guide is connected serially which is formed of an optical fiber section 30 having corresponding characteristics to those of the wave guide 30 in the device 11, so that the FWM phenomenon will take place therein as well. The linear cavity 125 is terminated, at its downstream end, with a filter 131 to which the optical fiber 126 is run. The filter 131 reflects, back along the same optical fiber 126, the signals whose wavelength is equal to the clone wavelength and allows the others to go through. As the filter 131, a photochromic grating filter may be used to advantage of the same type as that previously described in relation to the filter 31.

The section 125b of the linear cavity 125 comprises an optical fiber 127 in which a bi-directional optical amplifier 132 is connected serially, that is an amplifier having no input and output isolators, so that it can act on signals going through it in either directions. The amplifier 132 comprises, in particular (see FIG. 7), an active fiber section 150, a laser pump 151, an interconnection fiber 152, and a dichroic coupler 153.

The linear cavity 125 is terminated, at its upstream end, with a splitter 133 provided with four connections 134, 135, 136a and 136b, all of which are operational and connected as follows: the connection 134 is taken to the optical fiber 126 of the linear cavity 125, the connections 136a and 136b are connected together into a return loop, and the connection 135 is taken to an output optical fiber 137 of the linear cavity 125.

The device 11 further comprises a means of adjusting the length of the linear cavity 125, specifically a Peltier element 38 similar to the element 38 of the device 11. The element 38 is connected serially in one of the optical fibers, 126 or 127 (fiber 127 in FIG. 6), and is controlled by an electronic control unit 39 similar to the unit 39 for the device 11. Like in the instance of the device 11, the electronic control unit 39 is feedback operated by a fraction of the outgoing signal from the linear cavity 125 over the optical fiber 137, this fraction being tapped off through a splitter 140.

The operation of the device 111 is similar to that of the device 11, except that in the resonant cavity, the signals (in particular the clone signal) are not circulated around a closed loop-like path, but rather caused to travel back-and-forth along the linear path between the filter 131 and the coupler 133.

With both embodiments, the line signal is superimposed on the pumping radiation outside the resonant cavity in both the device 11 and the device 111, and accordingly, the resonant cavity is provided with a single input splitter 26 for the line signal and the pumping radiation. Alternatively, in a modification of the invention not shown in the drawings, the line signal and pumping radiation could be arranged to overlap within the resonant cavity. In this case, two separate splitters would have to be provided in the resonant cavity, one for the line signal and the other for the pumping radiation. In the latter modification, due to the increased attenuation introduced in the resonant cavity path by the additional splitter, a correspondingly higher amplification would obviously be required.

EXAMPLE

The invention has been actually tested under the following conditions, using the configuration shown in FIG. 1.

A line signal was used, as generated by an active mode-locking on-fiber laser which had a pulse repeat frequency of 500 MHz, output power varying between 100 µW and 1 mW, and emission wavelength varying between 1525 nm and 1570 nm, set at 1533 nm.

For the pumping radiation, a DFB laser was used which had an emission wavelength of 1536 nm, being amplified by an optical amplifier 47 Model TPA 12 from Pirelli, to obtain a power level of 10 mW.

The clone signal was, therefore, generated at a wavelength of 1539 nm.

As the amplifier 48, an optical amplifier Model TPA 17 from Pirelli was used, thereby bringing the power level of the line signal and the pumping radiation up to 50 mW. The ratio between the line signal power and the pumping radiation power (with the latter being much higher) was maintained through the amplification.

For the optical fiber section 30 of the loop-like path 25, a fiber coil DS was used which had a zero dispersion point at 1536 nm and was 10 km long.

The filter unit 31 used in the Example had been implemented in two stages in order to provide the desired filtering characteristics using available components. For the first stage, an interferometric filter having a 2.3 nm band centered on a wavelength of 1539 was used; for the second stage, a fabry-perot filter was used which had a 0.6 nm band, also centered on a wavelength of 1539 nm.

As the amplifier 32, an optical amplifier Model Ampliphos F10 from Pirelli was used whose gain was adjusted to almost fully compensate for the losses around the loop-like path 25, estimated at about 20 dB.

Figure 2:
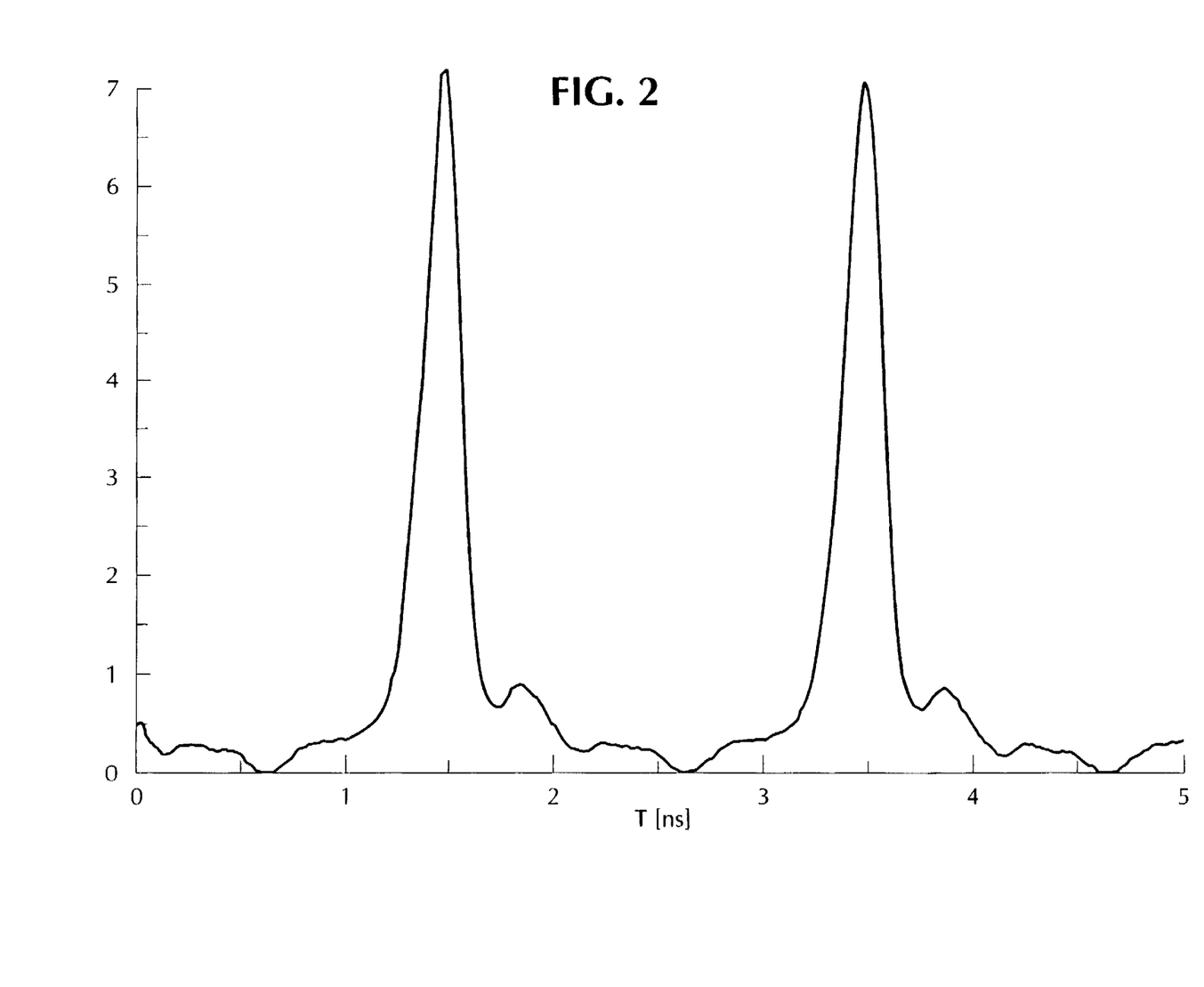
FIG. 2 shows a portion of the line signal used in the example.
Figure 3:
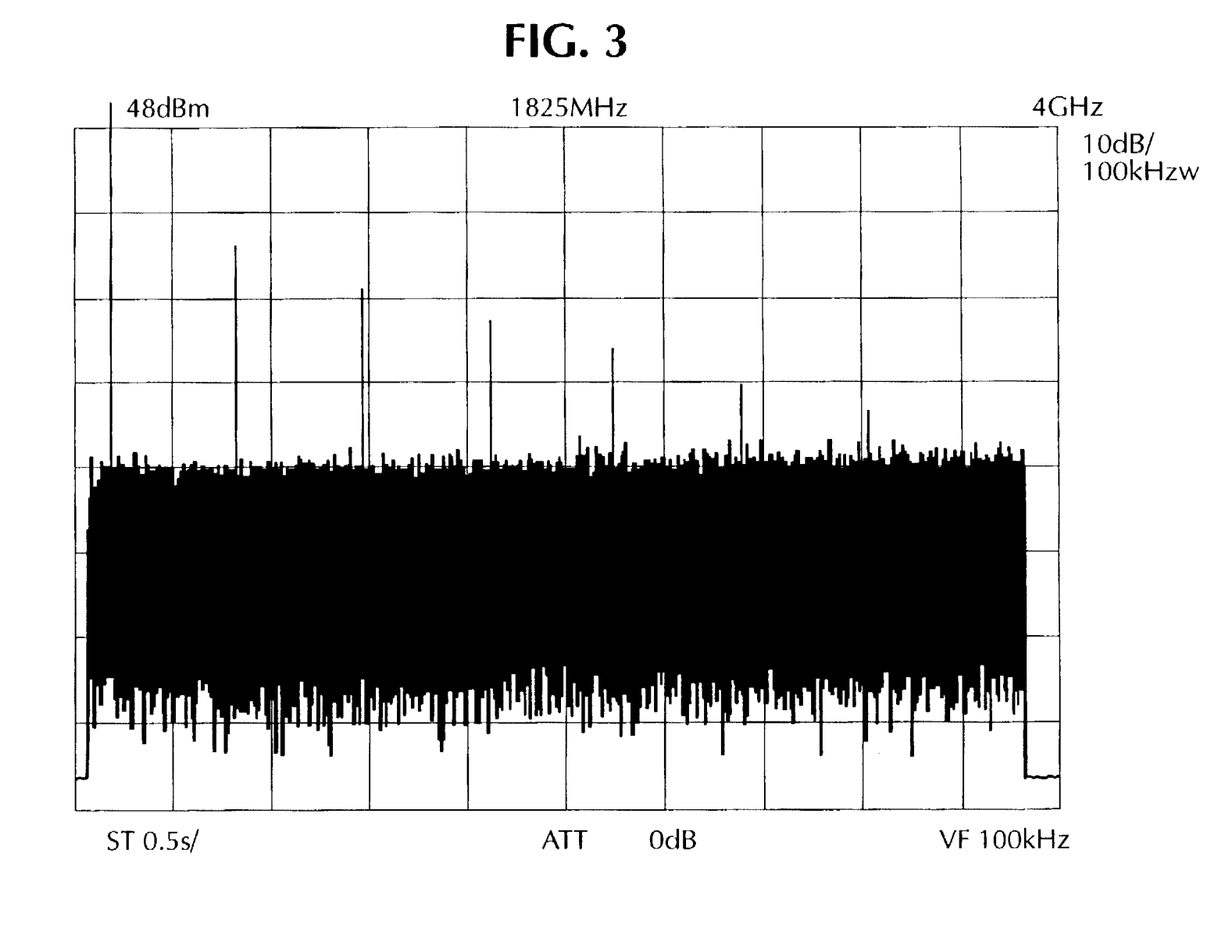
FIG. 3 shows the spectrum of the line signal in FIG. 2.

With this device, it has been possible to supply a correct clock signal for a line signal having a repeat frequency of 2500 MHz and a pulse sequence which contained 80% of 0 pulses; such a signal was simply obtained from an original signal at 500 MHz consisting of a sequence of 1 pulses and being interpreted as if at 2500 MHz. In particular, FIG. 2 shows a portion of the pulse train of the line signal wherein two 1 pulses can be seen as being separated by a number of 0 pulses; FIG. 3 shows the spectrum of the line signal, wherein the line at the dominant frequency of 500 MHz is noticeable.

Figure 4:
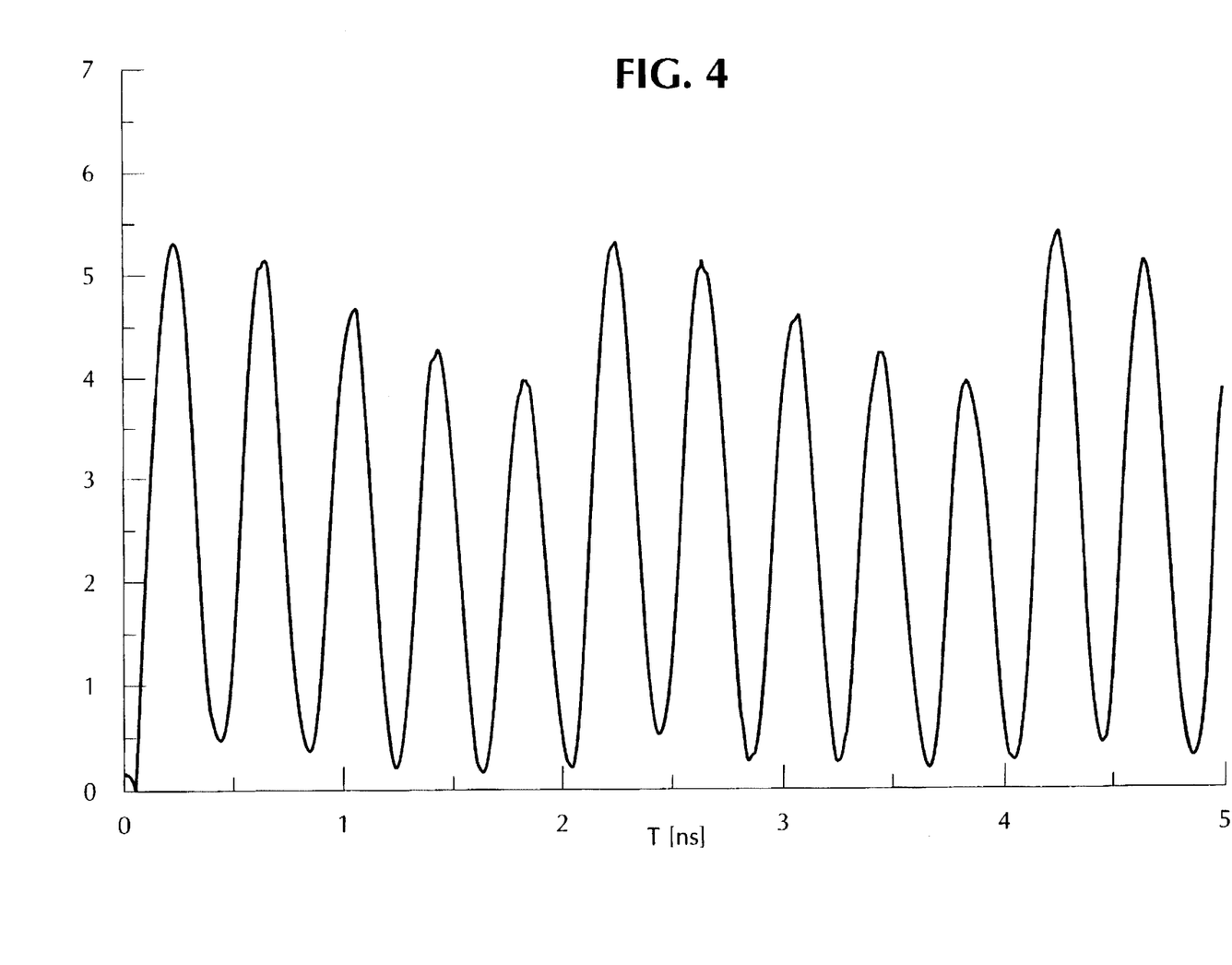
FIG. 4 shows the clock signal created in accordance with the invention.
Figure 5:
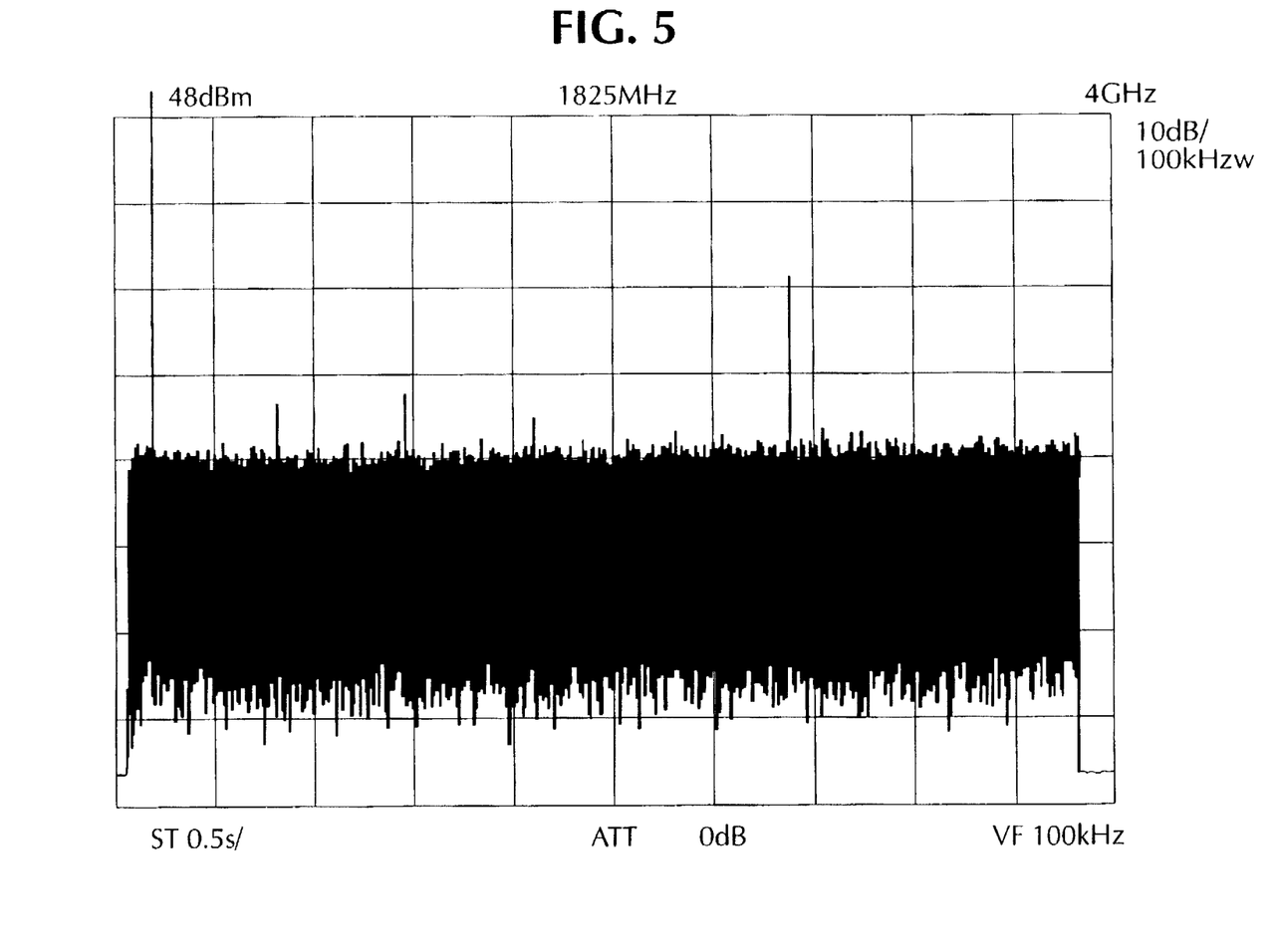
FIG. 5 shows the spectrum of the clock signal in FIG. 4.

The signal shown in FIG. 4 was obtained at the device 11 output whose spectrum is shown in FIG. 5; the 2500 MHz line is apparent there.

It should be noticed that the system operational frequency, i.e. the pulse repeat frequency, cannot be obtained from the clock recovery and should be known at the designing stage. In particular, the cavity length should be adjusted by means of the electronic control unit 39 for operation in the 2500 MHz range, not in the range of multiples.

We claim:

1. A method for optically recovering the synchronism of an optical line digital signal which comprises a sequence of digital pulses travelling through an optical fiber line at a preset pulse repeat frequency, by constructing an optical clock signal which comprises a pulse sequence having an identical repeat frequency, the method comprising the steps of:

tapping off a predetermined fraction of the line signal;

inputting the line signal fraction to a resonant cavity which includes a non-linear waveguide;

coupling the tapped-off line signal fraction with a continuous pumping radiation which has predetermined power and predetermined pumping wavelength, the pumping wavelength value being so related to the wavelength of the line signal pulses as to produce with the latter a four-wave mixing (FWM) effect in the non-linear waveguide;

causing the tapped-off line signal fraction and the pumping radiation to travel through the non-linear waveguide to generate, as by FWM effect, a clone signal duplicating the pulse sequence of the line signal at a clone wavelength;

filtering the aggregate of the line signal fraction, the pumping radiation, and the clone signal to only pass the latter;

circulating the clone signal within the resonant cavity;

adjusting the length of the resonant cavity such that, upon the line signal being input to the resonant cavity, each pulse of the line signal comes in exactly at a pulse of the clone signal being circulated within the cavity; and tapping a fraction of the clone signal off the resonant cavity, with the pulse sequence of the clone signal representing the clock signal sought.

2. A method according to claim 1, further comprising the step of:

amplifying the clone signal, adjusting its amplification for a gain of the clone signal lower by a predetermined value than the overall attenuation through the loop-like path.

3. A method according to claim 1, wherein the step of coupling the tapped-off line signal fraction with the continuous pumping radiation precedes the step of inputting the line signal fraction to the resonant cavity.

4. A method according to claim 1, wherein the resonant cavity comprises a loop-like optical path, with the non-linear wave guide being included in the loop-like path.

5. A method according to claim 1, wherein the resonant cavity comprises a linear cavity provided, at its extremities, with optical feedback means for at least a portion of the optical signals being propagated therein, the non-linear wave guide being included in the linear cavity.

6. A method according to claim 1, wherein the non-linear wave guide comprises an optical fiber having a shifted null point of optical dispersion.

7. A method according to claim 1, wherein the power of the line signal fraction tapped off the line is approximately 5 percent of the overall power of the line signal.

8. An optical clock recovery device for recovering the synchronism of an optical digital line signal which comprises a sequence of digital pulses travelling through a fiber optics line at a preset pulse repeat frequency, by the construction of an optical clock signal which comprises a sequence of pulses having an identical repeat frequency, the device comprising:

a first splitter, on the line for tapping a fraction of the line signal therefrom;

a generator of continuous pumping radiation having a predetermined power and predetermined pumping wavelength, the value of the pumping wavelength being related to the wavelength of the line signal pulses to produce a four-wave mixing (FWM) effect therewith;

a second splitter for coupling the tapped line signal fraction with the pumping radiation;

a resonant cavity;

a third splitter for inputting the tapped line signal fraction and pumping radiation to the resonant cavity;

within the resonant cavity, a non-linear wave guide of sufficient length to have a clone signal generated therein by FWM effect which duplicates the pulse sequence of the line signal at a clone wavelength;

an optical filter means within the resonant cavity to admit circulation inside the resonant cavity of the clone signal only;

a means for adjusting the length of the resonant cavity; and a fourth splitter on the resonant cavity for tapping, off the resonant cavity, a fraction of the clone signal travelling through the resonant cavity, the pulse sequence of the clone signal being the clock signal sought.

9. A device according to claim 8, wherein the resonant cavity includes an optical amplifying means for the clone signal.

10. A device according to claim 8, wherein the resonant cavity comprises a loop-like optical path, with the non-linear wave guide being included in the loop-like path.

11. A device according to claim 8, wherein the resonant cavity comprises a linear cavity provided at its extremities with optical feedback means for at least a portion of the optical signals being propagated therein, with the non-linear wave guide being included in the linear cavity.

12. A device according to claim 8, wherein the non-linear wave guide comprises an optical fiber having its optical dispersion null point shifted to a value close to the wavelength of the optical line signal.

* * * * *